(12) United States Patent
Li et al.

(10) Patent No.: US 11,233,413 B2
(45) Date of Patent: Jan. 25, 2022

(54) TERMINAL AND MULTI-PATH POWER SUPPLY CONTROL METHOD

(71) Applicant: XI'AN ZHONGXING NEW SOFTWARE CO., LTD., Shaanxi (CN)

(72) Inventors: Jiuxing Li, Guangdong (CN); Heng Zhang, Guangdong (CN); Tengfei Li, Guangdong (CN); Feng Zhang, Guangdong (CN); Dingzhu Duan, Guangdong (CN); Fei Wang, Guangdong (CN)

(73) Assignee: XI'AN ZHONGXING NEW SOFTWARE CO., LTD.

( * ) Notice: Subject to any disclaimer, the term of this patent is extended or adjusted under 35 U.S.C. 154(b) by 142 days.

(21) Appl. No.: 16/483,817

(22) PCT Filed: Dec. 29, 2017

(86) PCT No.: PCT/CN2017/120339
§ 371 (c)(1),
(2) Date: Aug. 6, 2019

(87) PCT Pub. No.: WO2018/145541
PCT Pub. Date: Aug. 16, 2018

(65) Prior Publication Data
US 2019/0393708 A1    Dec. 26, 2019

(30) Foreign Application Priority Data

Feb. 8, 2017 (CN) .......................... 201710068984.0

(51) Int. Cl.
*H02J 7/00* (2006.01)
*H02J 7/18* (2006.01)
*H02H 7/18* (2006.01)

(52) U.S. Cl.
CPC ............. *H02J 7/0063* (2013.01); *H02H 7/18* (2013.01); *H02J 7/0031* (2013.01); *H02J 7/00304* (2020.01); *H02J 7/00306* (2020.01)

(58) Field of Classification Search
CPC .......... H02J 7/0063; H02J 7/18; H02J 7/0031; H02J 7/00
See application file for complete search history.

(56) References Cited

U.S. PATENT DOCUMENTS

| 2012/0235473 A1* | 9/2012 | Jiang | H01M 50/20 307/9.1 |
| 2016/0211680 A1* | 7/2016 | Ganor | B60L 58/18 |
| 2016/0254664 A1* | 9/2016 | Huang | H02J 7/0003 307/52 |

FOREIGN PATENT DOCUMENTS

| CN | 105247755 A | 1/2016 |
| CN | 105845876 A | 8/2016 |
| CN | 107302244 A | 10/2017 |

OTHER PUBLICATIONS

English Translation of the International Search Report dated Apr. 3, 2018; International Patent Application No. PCT/CN2017/120339; ISA/CN.

* cited by examiner

*Primary Examiner* — Vuthe Siek
(74) *Attorney, Agent, or Firm* — McDonald Hopkins LLC

(57) ABSTRACT

Provided are a terminal and a control method of multi-path power supplying. The terminal includes: a battery module having power-supplying paths, power-supplying management modules in one-to-one correspondence with the power-supplying paths and a power supply control module. Each power-supplying path is connected to a power-supplying management module, a first end of each power-supplying management module is connected to a corresponding power-supplying path, a second end is connected to the power supply control module, a third end is connected to at least one function module. The battery module supplies power to at least one function module through multiple independent power-supplying paths. The power supply control module is (Continued)

configured to send a power-supplying control instruction to each power-supplying management module based on a power-supplying demand; Each power-supplying management module is configured to control power supplying of a power-supplying path managed by the power-supplying management module according to the power-supplying control instruction.

19 Claims, 3 Drawing Sheets

TERMINAL AND MULTI-PATH POWER SUPPLY CONTROL METHOD

CROSS-REFERENCE TO RELATED APPLICATION

This application is a 35 U.S.C. 371 national stage filing of PCT Application No. PCT/CN2017/120339 filed on Dec. 29, 2017, which claims priority to Chinese Patent Application No. 201710068984.0, entitled "TERMINAL AND MULTI-PATH POWER SUPPLY CONTROL METHOD" and filed on Feb. 8, 2017, the disclosures of which are incorporated herein in their entirety by reference.

TECHNICAL FIELD

The present disclosure relates to the communication field, for example, to a terminal and a control method of multi-path power supplying.

BACKGROUND

The battery generally used in the terminal is a liquid electrolyte battery, and the electrodes adopt a single positive electrode and a single negative electrode. A corresponding power-supplying management circuit is encapsulated with the battery for providing over-discharge protection, over-current protection, over-voltage protection, voltage stabilization output for the battery, and providing a corresponding battery power supply scheme to ensure that the battery can provide controllable voltage and current to each application module of the terminal and supply power to the terminal. A problem in such battery power supply scheme is that the terminal supplies power from a same place of the battery, which limits the flexibility of the power path selection. Once multiple application modules of the terminal interfere with each other through the power-supplying paths, the interference cannot be solved or optimized. The reason is that there is no room for adjustment when only one power-supplying path is provided. Meanwhile, since only one power-supplying path is provided, the length and width of the battery internal wiring and the terminal internal wiring will be limited, impedance of the wirings is increased, and utilization efficiency of the battery energy is reduced.

With the gradually maturing of the all-solid-state battery technology and its various performances are gradually improved, all-solid-state batteries are able to achieve multi-path charging and discharging. Using such type of battery can solve the problems existing in the battery scheme of the single power-supplying path to some extent. However, when the battery adopted by the terminal supports the multi-path charging and discharging, the battery is not effectively managed in the existing art and the power supply efficiency is not high.

SUMMARY

The embodiment of the present disclosure provides a terminal. The terminal includes a battery module having multiple power-supplying paths, multiple power-supplying management modules that are in one-to-one correspondence with each of the multiple power-supplying paths and a power supply control module; where each of the multiple power-supplying paths of the battery module is connected to a power-supplying management module, a first end of each power-supplying management module is connected to a power-supplying path, a second end is connected to the power supply control module, and a third end is connected to at least one function module in the terminal.

The battery module is configured to supply power to the at least one function module in the terminal through multiple independent power-supplying paths.

The power supply control module is configured to send a power-supplying control instruction to each power-supplying management module based on a power-supplying demand of each of the at least one function module in the terminal.

Each power-supplying management module is configured to control power supplying of a power-supplying path managed by the power-supplying management module according to the power-supplying control instruction sent from the power supply control module.

In one embodiment, each power-supplying management module is configured to control at least one of power-supplying current and voltage of the power-supplying path managed by the power-supplying management module based on the power-supplying control instruction sent from the power supply control module.

In one embodiment, the power supply control module is further configured to in response to determining that a function module malfunctions, send a control instruction for disconnecting the power-supplying path to the power-supplying management module connected to the malfunctioned function module.

In one embodiment, the power supply control module is further configured to after sending the control instruction for disconnecting the power-supplying path to the power-supplying management module connected to the malfunctioned function module, send a message to prompt that the function module is malfunctioned.

In one embodiment, the power supply control module is further configured to acquire working state parameters of at least one module of a group consisting of: each function module in the terminal and the battery module; provide a power supply strategy matched with the working state parameters, and based on the matched power supply strategy, send the power-supplying control instruction to a corresponding power-supplying management module.

The embodiment of the present disclosure further provides a control method of multi-path power supplying. A battery module of a terminal supplies power to each function module in the terminal through multiple independent power-supplying paths, each of the multiple independent power-supplying paths corresponds to at least one function module in the terminal, the method includes:

determining a power-supplying demand of each function module in the terminal; and controlling, according to the power-supplying demand of the each function module in the terminal, power supplying of a corresponding power-supplying path supplying power to the function module to enable each of the multiple independent power-supplying paths to supply power to at least one function module in the terminal as needed.

In one embodiment, controlling, according to the power-supplying demand of the each function module in the terminal, power supplying of a corresponding power-supplying path supplying power to the function module includes: controlling at least one of power-supplying current and voltage of the corresponding power-supplying path of each function module.

In one embodiment, the method further includes: when a function module malfunctions, controlling the power-supplying path supplying power to the malfunctioned function module to be disconnected.

In one embodiment, the method further includes: when controlling the power-supplying path supplying power to the malfunctioned function module to be disconnected, sending a message to prompt that the function module is malfunctioned.

In one embodiment, controlling power supplying on the corresponding power-supplying path supplying power to each function module according to the power-supplying demand of the function module includes: acquiring working state parameters of at least one module of a group consisting of: each function module in the terminal and the battery module; providing a power supply strategy matched with the working state parameters, and based on the matched power supply strategy, controlling power supplying on the power-supplying path of the corresponding function module.

The embodiment further provides a computer-readable storage medium configured to store computer-executable instructions for executing the multi-path power supply method described above.

The terminal and the control method of multi-path power supplying of the present disclosure can better manage and control each function module of the terminal and provide safer and smarter user experience while improving power efficiency.

DETAILED DESCRIPTION

Exemplary embodiments of the present disclosure will be described in detail with reference to the drawings.

Figure 1:
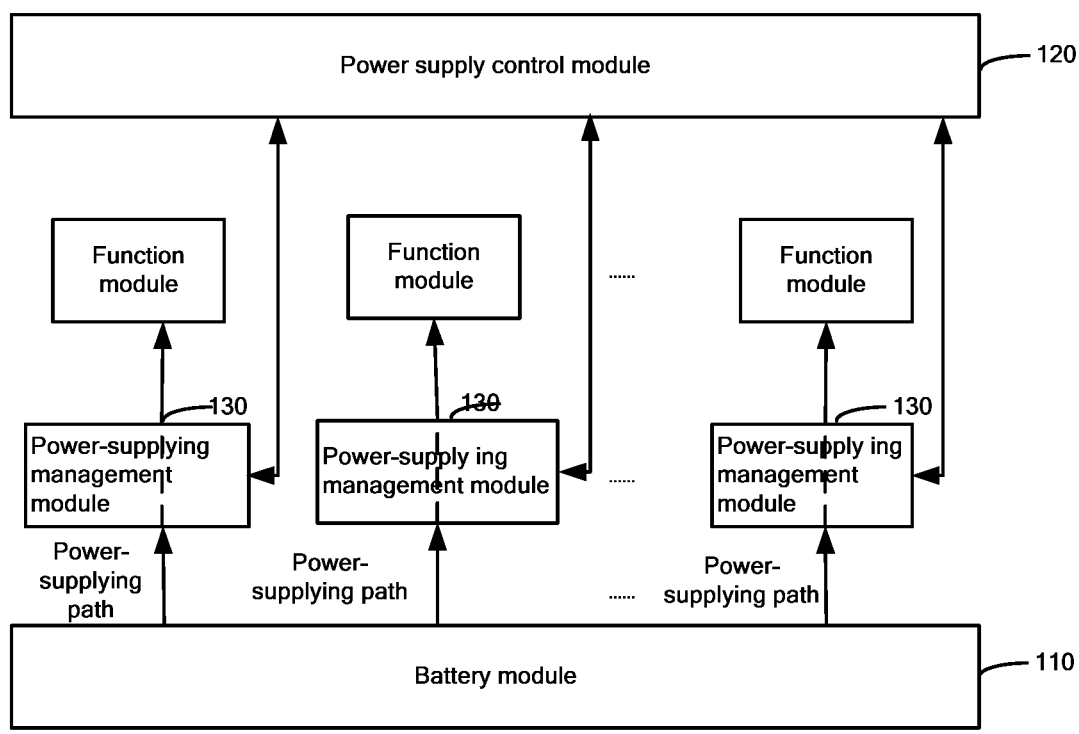
FIG. 1 is a block diagram illustrating a terminal provided by an embodiment of the present disclosure.

The embodiment of the present disclosure provides a terminal. The terminal may control and manage the multi-path power control. As shown in FIG. 1, the terminal includes: a battery module 110 having a multi-path function and multiple power-supplying paths, multiple power-supplying management modules 130 that are in one-to-one correspondence with each of the multiple power-supplying paths and a power supply control module 120. Each of the multiple power-supplying paths of the battery module 110 is connected to a power-supplying management module 130, a first end of each power-supplying management module 130 is connected to a corresponding power-supplying path, a second end is connected to the power supply control module 120, and a third end is connected to at least one function module in the terminal.

The battery module 110 is configured to supply power to the at least one function module in the terminal through multiple independent power-supplying paths.

The power supply control module 120 is configured to send a power-supplying control instruction to each power-supplying management module 130 on a power-supplying demand of each of at least one function module in the terminal.

Each of power-supplying management module 130 is configured to control power supplying of a power-supplying path managed by the each power-supplying management module 130 according to the power-supplying control instruction sent by the each power supply control module 120.

In the embodiment of the present disclosure, the battery module 110 may include: a chemical reaction module for power supplying, a battery power-supplying management module for implementing functions such as protection and control and at least one of a connector and a resilient piece which are connected to a relevant circuit of a mainboard of the terminal. The battery module 110 of the embodiment is a battery module capable of implementing the multi-path power supply, and the type of the battery module may be, but is not limited to, an all-solid-state battery.

In the embodiment of the present disclosure, positive and/or negative electrodes and other related signals (such as a battery ID and battery temperature information detected by a thermistor) are led out from the battery module 110, and supply power to different function modules in the terminal separately. Since different power-supplying paths for different function modules are separated, thus different function modules do not interfere with each other through the power-supplying paths. In one embodiment, the power-supplying paths may also be partially separated (such as a case of only sharing a power backflow plane (sharing a negative electrode)), so that different function modules do not interfere with each other through the power-supplying paths. Such multi-path power supply scheme is capable of solving problems, such as an interference problem of sharing the power supply between a radio frequency module and a baseband module of the terminal, and an audio noise problem caused by mutual influence of backflows of the radio frequency module and an audio module. In addition, through a reasonable design, a length of the power-supplying path for each function module may be shortened as much as possible, which can fundamentally reduce the external radiation interference and improve power utilization efficiency.

In the embodiment of the present disclosure, each function module in the terminal is used for implementing each function of the terminal, for example, the function module of the terminal may include a memory, a central processing unit, and an input/output device, etc.

In the embodiment of the present disclosure, the power-supplying management module 130 connected to each power-supplying path is configured to perform the power supply control on the corresponding power-supplying path, including control of a current magnitude, control of turning on or off of the power-supplying path. The power-supplying management module 130 connected to each power-supplying path is not independent, but is connected to the power supply control module 120 through a bus (such as an I2C bus, etc.), thereby implementing a system-level control for supplying power to the terminal. In this embodiment, the power-supplying management module 130 may be an independent management module, or may be integrated inside other modules of the terminal, such as integrated inside the power-supplying management module.

The system-level control for supplying power to the terminal implemented by each power-supplying management module 130 under the control of the power supply control module 120 in this embodiment is described below.

In the embodiment of the present disclosure, the power-supplying management module 130 is configured to control at least one of power-supplying current and voltage of the power-supplying path managed by the power-supplying management module 130 based on the power-supplying control instruction when receiving the power-supplying control instruction sent by the power supply control module 120 according to the power-supplying demand of the corresponding function module.

In the embodiment of the present disclosure, the power supply control module 120 is further configured to when the function module (which may be one or more of the multiple function modules) malfunctions, send a control instruction for disconnecting the power-supplying path to the power-supplying management module 130 connected to the malfunctioned function module. When the power-supplying management module 130 receives the control instruction for disconnecting the power-supplying path, the power-supplying path between the battery module 110 and the corresponding malfunctioned function module is disconnected.

In one embodiment, the power supply control module 120 may further send a message to the user to prompt that the function module is malfunctioned after sending the control instruction for disconnecting the power-supplying path to the power-supplying management module connected to the malfunctioned function module.

The malfunction of the function module includes, but is not limited to, short circuit or damage. When function module is short-circuited or damaged, the power-supplying current on the power-supplying path inevitably changes, in this embodiment, the power-supplying management module 130 may periodically collect power supply information on the power-supplying path and feed the power supply information back to the power supply control module 120, and the power supply control module 120 sends the control instruction for disconnecting the power-supplying path at the time of determining that the function module malfunctions according to the power supply information on the power-supplying path. Of course, in this embodiment, the power supply control module 120 may also determine whether the function module malfunctions through other channels, which is not listed herein.

In one exemplary embodiment of the present disclosure, the power supply control module 120 is further configured to acquire working state parameters of at least one module of a group consisting of: each function module in the terminal and the battery module; provide a power supply strategy matched with the working state parameters, and based on the matched power supply strategy, send the power-supplying control instruction to a corresponding power-supplying management module.

In this embodiment, the power supply control module 120 may determine states of each function module and the battery module 110, such as a heating condition and battery energy according to the acquired working state parameters, so that the power-supplying current on some power-supplying paths may be reasonably controlled according to the states of the modules. In this embodiment, the power supply strategy of the modules in different states may be pre-set, so that a strategy matching may be performed directly according to the parameters during the operation, thereby performing the power supply control. The power supply strategy may be flexibly set by those skilled in the art as needed, which is not specifically limited in this embodiment.

Adopting the embodiment is able to effectively improve the power supply efficiency and effectively optimize the power-supplying current distribution, reduce the overall heat generation, and since the multi-path management is adopted for the battery, the power-supplying current of each path may be controlled according to battery parameters, thereby achieving better protection for the battery and prolonging the battery life.

In the above embodiment, the terminal, through independently controlling each power path, can better manage and control each function module of the terminal, and provide safer and smarter user experience while improving power efficiency.

The embodiments of the present disclosure will be described below in detail through the following two application examples.

Application Example One

Figure 2:
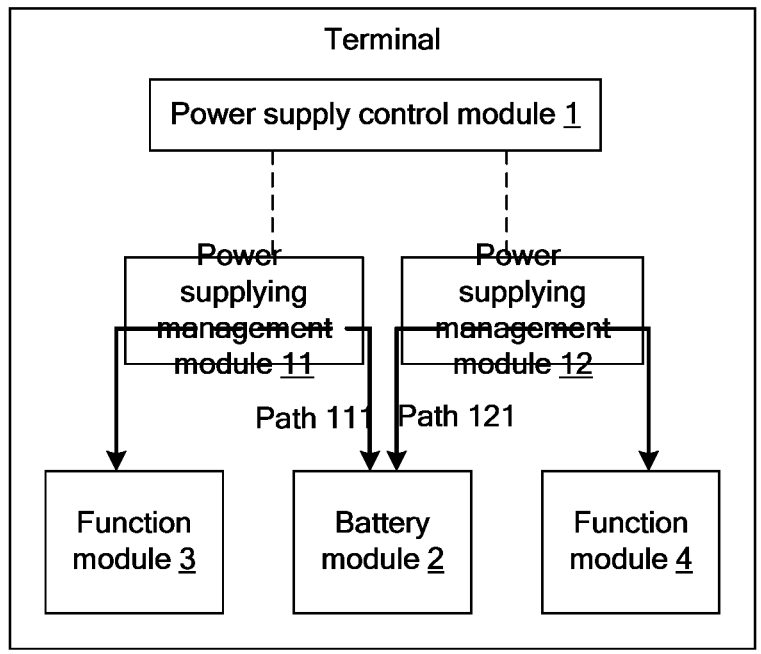
FIG. 2 is a block diagram of a terminal in an application example one provided by an embodiment of the present disclosure.

This application example provides a terminal, as shown in FIG. 2. The terminal includes: a power supply control module 1, power-supplying management modules 11 and 12, function modules 3 and 4, and a battery module 2. In the application example, the power supply control module 1 is connected to the power-supplying management modules 11 and 12, implementing power supply control of two power-supplying paths 111 and 121. The power-supplying management modules 11 and 12 may separately control a current value of the power-supplying paths and turn on or off the power-supplying paths connected to the power-supplying management modules, and may feed data back to the power supply control module 1 and execute a control instruction to the power supply control module 1. The battery module 2 is used for providing power for each function module of the terminal at the time of power supply.

Control of a current of each power-supplying path may be based on an electrical parameter of each function module of the terminal, and may also be based on safety and reliability requirements for heat generation, short-circuited or damaged module and the like. After obtaining feedback data of the function module of the terminal, the power supply control module 1 may process the feedback data by itself, or prompt the user or propose a request to the user through an output device of the terminal. For example: after an audio amplifier module is damaged due to short circuit, in order to prevent fire by short circuit heating, a power-supplying path for the audio amplifier module is automatically disconnected, and the user is fed back and prompted that "the audio amplifier module is damaged, a horn function cannot be used, and a professional is asked for maintaining or replacing the audio power amplifier module".

The power supply control module 1 may be integrated into other function modules or may be a separate control module. For example, the power supply control module 1 may belong to a terminal module, or be placed in a module inside the battery.

Communications between the power supply control module 1 and the power management modules 11 as well as may be unidirectional or bidirectional. An interface of the communications or a form of a bus may be various, which may be a communication interface type (an I2C bus, etc.) commonly used in the industry, or a communication interface type of a custom protocol.

An energy storage type of the battery module 2 may be optional, including but is not limited to a commonly used battery or all-solid-state battery.

The path 111 is a circuit connection path of the power supply among the terminal function module 3, the power-supplying management module 11 and the battery module. The battery module 2 supplies power to the function module 3 of the terminal by the power-supplying management module 11. FIG. 2 exemplarily shows relevant power-supplying paths, but it does not indicate that other circuits related to control and communication and used in actual applications are not included.

The similar path 121 has the corresponding correspondence.

Functions of each function module described above may include all or part of the functions, and function extensions may also be implemented by simple combination or the like on the basis of the functions described above. In addition, the application scope of this application example includes, but is not limited to, the number of the power supply and discharging paths, and correspondingly, the number of the terminal function modules separately supplying power the terminals also is not limited to the number described in the above embodiment.

Application Example Two

Figure 3:
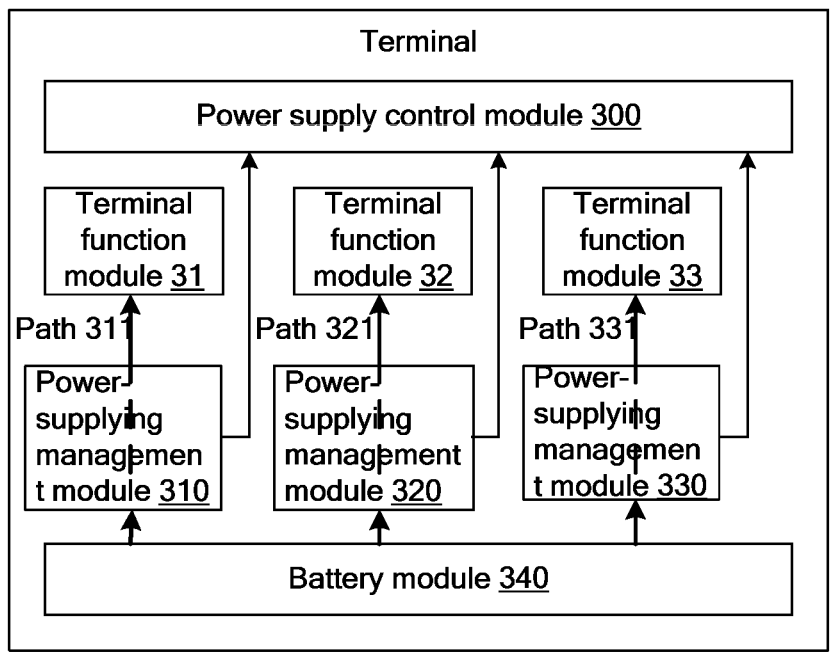
FIG. 3 is a block diagram of a terminal in an application example two provided by an embodiment of the present disclosure.

This application example provides a terminal, as shown in FIG. 3. The terminal includes: a power supply control module 300, power-supplying management modules 310, 320, and 330, terminal function modules 31, 32 and 33 and a battery module 340.

In this embodiment, the power supply control module 300 is connected to the power-supplying management modules 310, 320, and 330, implementing power-supplying path current control of paths 311, 321 and 331. The power-supplying management modules 310, 320, and 330 may control a current value of each power-supplying path, and may feed back to the power supply control module 300 and execute a control instruction to the power supply control module 300. The paths 311, 321 and 331 are power-supplying paths supplying power for the terminal function modules 31, 32 and 33 separately by the battery module 340. The battery module 340 is used for providing power for each function module of the terminal at the time of power supply. The power supply control module 300 may be integrated into other function modules or may be a separate control module.

Communications between the power supply control module 300 and the power management modules 310, 320, as well as 330 may be unidirectional or bidirectional. An interface of the communications or a form of a bus may be various, which may be a communication interface type (an I2C bus, etc.) commonly used in the industry, or a communication interface type of a custom protocol. The power-supplying management module 310 may control a magnitude of a current connected to the power-supplying management module. The power-supplying management modules 320 and 330 also have similar functions.

An energy storage type of the battery module 340 may be optional, including but is not limited to a commonly used ion battery or all-solid-state battery.

The path 311 is a circuit connection path of the power supply among the terminal function module 31, the power-supplying management module 310 and the battery module. The battery module 340 performs power supply control on the terminal function module 31 by the power-supplying management module 310. The power-supplying management module 310 communicates with the power supply control module 300 to implement that a power-supplying current is fed back to the power supply control module 300 and the power supply control module 300 controls the power-supplying current through the power-supplying management module 310. FIG. 3 exemplarily shows all relevant power-supplying paths, but it does not indicate that other circuits related to control and communication and used in actual applications are not included.

The similar paths 321 and 331 have the corresponding correspondence.

Functions of each function module described above may include all or part of the functions, and function extensions may also be implemented by simple combination or the like on the basis of the functions described above. In addition, the application scope of this application example includes, but is not limited to, the number of the power supply and discharging paths, and correspondingly, the number of the terminal function modules separately supplying power the terminals is not limited to the number described in the above embodiment.

Figure 4:
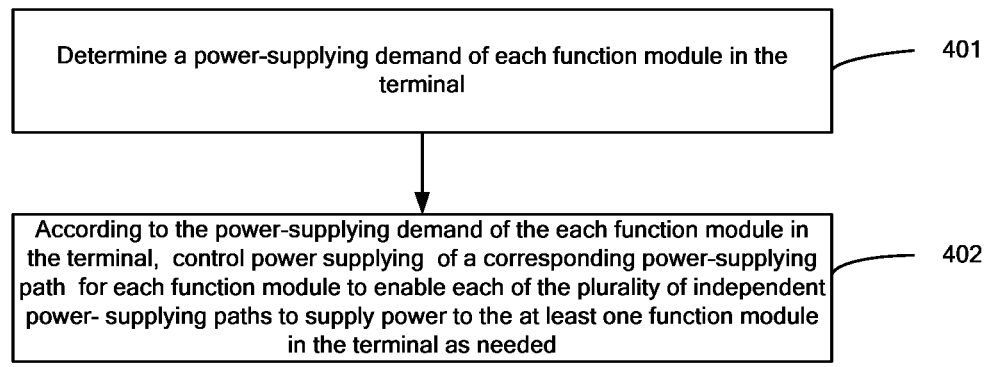
FIG. 4 is a flowchart of implementing a multi-path power control management method by a terminal provided by an embodiment of the present disclosure.

An embodiment of the present disclosure further provides a control method of multi-path power supplying. A battery module of a terminal supplies power to each function module in the terminal through multiple independent power-supplying paths, each of the multiple independent power-supplying paths corresponds to at least one function module in the terminal. As shown in FIG. 4, the method includes the steps described below.

In step 401, a power-supplying demand of each function module in the terminal is determined.

In step 402, according to the power-supplying demand of the each function module in the terminal, power supply control is performed on a corresponding power-supplying path supplying power to the each function module to enable each of the multiple independent power-supplying paths to supply power to the at least one function module in the terminal as needed.

In the embodiment of the present disclosure, the step in which the power supply control is performed on the corresponding power-supplying path supplying power to the each function module includes: controlling at least one of a power-supplying current and a voltage of the corresponding power-supplying path of the each function module.

In one exemplary embodiment of the present disclosure, the method further includes: when a function module malfunctions, controlling the power-supplying path supplying power to the malfunctioned function module to be disconnected.

In one exemplary embodiment, the method further includes: when controlling the power-supplying path supplying power to the malfunctioned function module to be disconnected, sending information to the user to prompt that the function module is malfunctioned.

In one exemplary embodiment of the present disclosure, the step in which the power supply control is performed on the corresponding power-supplying path supplying power to the each function module according to the power-supplying demand of the each function module includes: acquiring working state parameters of at least one module of a group consisting of: each function module in the terminal and the battery module; providing a power supply strategy matched with the working state parameters, and based on the matched power supply strategy, performing the power supply control on the power-supplying path of the corresponding function module.

The method described in the above embodiment, through independently controlling each power path, can better manage and control each function module of the terminal and provide safer and smarter user experience while improving power efficiency.

It will be understood by those of ordinary skill in the art that all or part of the steps in the various method described in the above embodiments may be implemented by related hardware instructed by one or more programs, and these programs may be stored in a computer-readable storage medium which may include a ROM, a RAM, a magnetic disk, an optical disk or the like.

The embodiment further provides a computer-readable storage medium configured to store computer-executable instructions for executing the multi-path power supply method described above.

Figure 5:
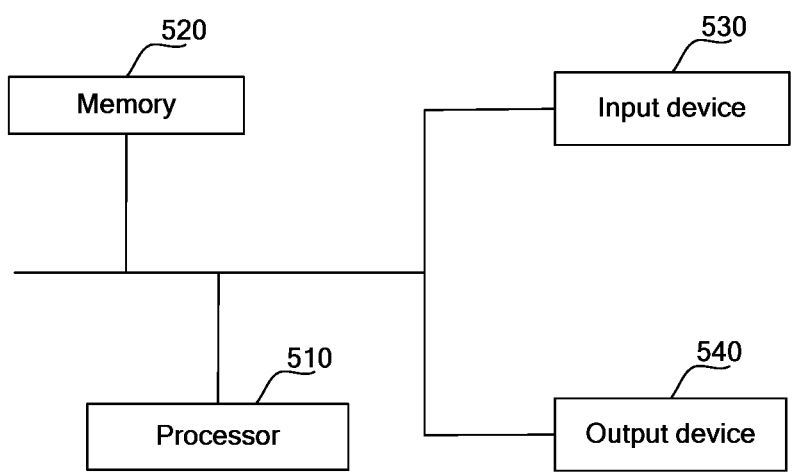
FIG. 5 is a structural diagram of hardware of a terminal device provided by an embodiment of the present disclosure.

FIG. 5 is a structural diagram of hardware of a terminal device according to an embodiment of the present disclosure. As shown in FIG. 5, the terminal device includes one or more processors 510 and a memory 520. One processor 510 is taken as an example in FIG. 5.

The terminal device may further include an input device 530 and an output device 540.

The processor 510, the memory 520, the input device 530, and the output device 4140 in the terminal device may be connected via a bus or in other manners. FIG. 5 uses connection via a bus as an example.

As a computer-readable storage medium, the memory 520 is used for storing software programs and computer-executable programs and modules. The processor 510 operates the software programs, instructions and modules stored in the memory 520 to perform function applications and data processing, that is, to implement any multi-path power supply method in the above-mentioned embodiments.

The memory 520 may include a program storage region and a data storage region, where the program storage region may store an operating system and an application program required by at least one function while the data storage region may store data created according to use of a terminal device. In addition, the memory 520 may include a volatile memory, such as a random access memory (RAM), and may also include a nonvolatile memory, such as at least one click memory, a flash memory or other nonvolatile solid-state memories.

The memory 520 may be a non-transient computer storage medium or a transient computer storage medium. The non-transient computer storage medium includes, for example, at least one disk memory, a flash memory or another nonvolatile solid-state memory. In some embodiments, the memory 520 optionally may include memories which are remotely disposed relative to the processor 510 and these remote memories may be connected to the terminal device via a network. Examples of such a network may include the Internet, intranets, local area networks, mobile communication networks, and combinations thereof.

The input device 530 may be used for receiving inputted digital or character information and for generating key signal input related to user settings and function control of the terminal device. The output device 540 may include a display screen and another display device.

INDUSTRIAL APPLICABILITY

The terminal and control method of multi-path power supplying provided by the present disclosure can better manage and control each function module of the terminal and provide safer and smarter user experience while improving power efficiency.

What is claimed is:

1. A terminal, comprising: a power supply control circuit, a battery having a plurality of independent power-supplying paths, and a plurality of power-supplying management circuits wherein each of the plurality of power-supplying management circuits comprises a first end, a second end and a third end, the first end is connected to a respective one of the plurality of power-supplying paths of the battery the second end is connected to the power supply control circuit, and the third end is connected to at least one function circuit in the terminal;

the battery is configured to supply power to the at least one function circuit in the terminal through the plurality of independent power-supplying paths;

the power supply control circuit is configured to send a power-supplying control instruction to each of the plurality of power-supplying management circuits based on a power-supplying demand of each of the at least one function circuit in the terminal; and the each of the plurality of power-supplying management circuits is configured to control, according to the power-supplying control instruction sent from the power supply control circuit, power supplying on the respective one of the plurality of power-supplying paths managed by the each of the plurality of power-supplying management circuits.

2. The terminal of claim 1, wherein the each of the plurality of power-supplying management circuits is configured to control, according to the power-supplying control instruction sent from the power supply control circuit, at least one of power-supplying current or voltage of the respective one of the plurality of power-supplying paths managed by the each of the plurality of power-supplying management circuits.

3. The terminal of claim 2, wherein the power supply control circuit is further configured to, in response to determining that one of the at least one function circuit malfunctions, send a control instruction for disconnecting the power-supplying path to the power-supplying management circuit connected to the malfunctioned function circuit.

4. The terminal of claim 2, wherein the power supply control circuit is further configured to:

acquire working state parameters of at least one of: each of the at least one function circuit in the terminal and the battery; and provide a power supply strategy matched with the working state parameters, and based on the matched power supply strategy, send the power-supplying control instruction to a corresponding power-supplying management circuit.

5. The terminal of claim 1, wherein the power supply control circuit is further configured to, in response to determining that one of the at least one function circuit malfunctions, send a control instruction for disconnecting the power-supplying path to the power-supplying management circuit connected to the malfunctioned function circuit.

6. The terminal of claim 5, wherein the power supply control circuit is further configured to, after sending the control instruction for disconnecting the power-supplying path to the power-supplying management circuit connected to the malfunctioned function circuit, send a message to prompt that the function circuit is malfunctioned.

7. The terminal of claim 6, wherein the power supply control circuit is further configured to:
acquire working state parameters of at least one of: each of the at least one function circuit in the terminal and the battery; and
provide a power supply strategy matched with the working state parameters, and based on the matched power supply strategy, send the power-supplying control instruction to a corresponding power-supplying management circuit.

8. The terminal of claim 5, wherein the power supply control circuit is further configured to:
acquire working state parameters of at least one of: each of the at least one function circuit in the terminal and the battery; and
provide a power supply strategy matched with the working state parameters, and based on the matched power supply strategy, send the power-supplying control instruction to a corresponding power-supplying management circuit.

9. The terminal of claim 1, wherein the power supply control circuit is further configured to:
acquire working state parameters of at least one of: each of the at least one function circuit in the terminal and the battery; and
provide a power supply strategy matched with the working state parameters, and based on the matched power supply strategy, send the power-supplying control instruction to a corresponding power-supplying management circuit.

10. A control method of multi-path power supplying, applied to a terminal which comprises a power supply control circuit, a battery having a plurality of independent power-supplying paths, and a plurality of power-supplying management circuits; wherein each of the plurality of power-supplying management circuits comprises a first end, a second end and a third end, the first end is connected to a respective one of the plurality of power-supplying paths of the battery, the second end is connected to the power supply control circuit, and the third end is connected to at least one function circuit in the terminal; the battery is configured to supply power to the at least one function circuit in the terminal through the plurality of independent power-supplying paths; the power supply control circuit is configured to send a power-supplying control instruction to each of the plurality of power-supplying management circuits based on a power-supplying demand of each of the at least one function circuit in the terminal; and the each of the plurality of power-supplying management circuits is configured to control, according to the power-supplying control instruction sent from the power supply control circuit, power supplying on the respective one of the plurality of power-supplying paths managed by the each of the plurality of power-supplying management circuits;
wherein the method comprises:
determining the power-supplying demand of the each of the at least one function circuit in the terminal; and
controlling, according to the power-supplying demand, power supplying on the respective one of the plurality of power-supplying paths corresponding to and supplying power to the each of the at least one function circuit, so as to enable the respective one of the plurality of power-supplying paths to supply power to the each of the at least one function circuit in the terminal as needed.

11. The method of claim 10, wherein controlling power supplying on the respective one of the plurality of power-supplying paths supplying power to the each of the at least one function circuit comprises:
controlling at least one of power-supplying current or voltage of the respective one of the plurality of power-supplying paths corresponding to the each of the at least one function circuit.

12. The method of claim 11, further comprising: in response to determining that one of the at least one function circuit malfunctions, controlling the power-supplying path supplying power to the malfunctioned function circuit to be disconnected.

13. The method of claim 11, wherein the controlling, according to the power-supplying demand, power supplying on the respective one of the plurality of power-supplying paths corresponding to and supplying power to the each of the at least one function circuit comprises:
acquiring working state parameters of at least one of: each function circuit in the terminal and the battery; and
providing a power supply strategy matched with the working state parameters, and based on the matched power supply strategy, controlling power supplying on the power-supplying path of the corresponding function circuit.

14. The method of claim 10, further comprising: in response to determining that one of the at least one function circuit malfunctions, controlling the power-supplying path supplying power to the malfunctioned function circuit to be disconnected.

15. The method of claim 14, further comprising: in response to controlling the power-supplying path supplying power to the malfunctioned function circuit to be disconnected, sending a message to prompt that the function circuit is malfunctioned.

16. The method of claim 15, wherein the controlling, according to the power-supplying demand, power supplying on the respective one of the plurality of power-supplying paths corresponding to and supplying power to the each of the at least one function circuit comprises:
acquiring working state parameters of at least one of: each function circuit in the terminal and the battery; and
providing a power supply strategy matched with the working state parameters, and based on the matched power supply strategy, controlling power supplying on the power-supplying path of the corresponding function circuit.

17. The method of claim 14, wherein the controlling, according to the power-supplying demand, power supplying on the respective one of the plurality of power-supplying paths corresponding to and supplying power to the each of the at least one function circuit comprises:
acquiring working state parameters of at least one of: each function circuit in the terminal and the battery; and
providing a power supply strategy matched with the working state parameters, and based on the matched power supply strategy, controlling power supplying on the power-supplying path of the corresponding function circuit.

18. The method of claim 10, wherein the controlling, according to the power-supplying demand, power supplying on the respective one of the plurality of power-supplying paths corresponding to and supplying power to the each of the at least one function circuit comprises:
acquiring working state parameters of at least one of: each function circuit in the terminal and the battery; and
providing a power supply strategy matched with the working state parameters, and based on the matched power supply strategy, controlling power supplying on the power-supplying path of the corresponding function circuit.

19. A non-transitory computer-readable storage medium storing computer-executable instructions for executing the method of claim 10.

* * * * *